2,827,495
SEPARATION OF KETALS

George Claude Bond, Freeport, and Lloyd Albert Klar, Lake Jackson, Tex., assignors to The Dow Chemical Company, Midland, Mich., a corporation of Delaware No Drawing. Application March 1, 1956
Serial No. 568,712

12 Claims. (Cl. 260—616)

This invention relates to a process for separation of ketals from mixtures containing water, alcohol, ketone and ketal. More particularly, it relates to the separation of lower ketals from mixtures containing water, primary alcohols having from 1 to 3 carbon atoms, ketones having from 3 to 5 carbon atoms, and the lower ketals in concentrations greater than 5 percent by weight.

Recently, a method for preparation of ketals by a direct additive reaction of a ketone and an alcohol has been discovered. In this process the ketal produced is in a reaction product which contains some of the reactants, alcohol and ketone, and water, with the concentration of the ketal being, usually, from 10 to 20 weight percent. The reaction is reversible and a problem is encountered in attempting to separate the ketal from this mixture without hydrolyzing the product. In addition to the hydrolyzation, the physical properties of the components in the reaction product are such that the usual methods for separation of hydrocarbons are not effective, especially when the concentrations of the ketal are below 25 weight percent. In distillation of the mixture, close boiling point azeotropes are obtained rendering the separation impractical. The extraction of the ketal by organic solvents is likewise impractical due to the mutual solubilities of the constituents.

It is, therefore, the principal object of this invention to provide a method whereby ketals can be separated easily from mixtures containing alcohol, ketone, water, and ketal without hydrolyzation of the product and to provide a method which would be applicable even when the concentration of ketal in such mixtures is relatively small.

The process for separation of a lower ketal from a mixture containing water, primary alcohols having from 1 to 3 carbon atoms, ketones having from 3 to 5 carbon atoms, and the lower ketals in amounts greater than 5 weight percent according to the invention, comprises contacting the above mixture with an aqueous solution containing from 10 to 30 weight percent of a strong hydroxide, such as sodium hydroxide and potassium hydroxide, in amounts such that the volume ratio of the hydroxide solution to the ketal solution is in the range of ½ to 20 to extract the major part of the other constituents from the ketal, and recovering the ketal.

The term "lower ketal" as used herein means the ketals represented by the general formula:

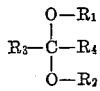

wherein $R_1$ and $R_2$ represent alkyl groups having from 1 to 3 carbon atoms, and $R_3$ and $R_4$ represent alkyl groups having from 1 to 2 carbon atoms.

In the process the mixture of alcohols, ketones, water, and ketal, can be contacted with the strong hydroxide solutions in batch or continuous operation. No special equipment is required, and the known types of extraction equipment operated according to the accepted engineering practice may be used. When a batch operation is used, it is preferred to divide the hydroxide solution in several parts and to use a simple multistage contact extraction, the procedure being to add part of the hydroxide to the ketal mixture, separate the ketal-containing part from the resulting heterogeneous solution, and to again contact this recovered ketal-containing portion with more fresh hydroxide. A continuous countercurrent process is more convenient. The equipment can be selected and operated under the known engineering practices so that, preferably, more than one theoretical contact stage is obtained. When a single contact stage is used, the ketal-containing portion of the heterogeneous mixture will be about 85 percent ketal and contain about 90 percent of the total ketal. When using more than one ideal contact stage, it is possible to recover practically all of the ketal from the mixture as a product containing 97 percent ketal and the remainder being acetone and water. The necessary number of stages to obtain the above high yields are relatively few, usually less than 3. When more than 3 ideal stages are used, very little additional improvement in the recovery or purity of the product is obtained.

The concentration of the hydroxide used is critical. To obtain any recovery of the ketal the concentration of the hydroxide must be at least 10 weight percent. A very sharp improvement in ketal recovery is evidenced when the concentration of the hydroxide is increased from 10 to 16 percent. When the concentration of the solution is further increased, from 16 to 30, only a slight gradual improvement is obtained. Thus, it is preferred to use a hydroxide solution of 13 to 16 percent concentration.

The volume ratio of hydroxide solution to the ketal solution used may be varied over a wide range from ½ to 20. The amounts of hydroxide solution used will affect both the recovery of the ketal and the concentration of the ketal in the ketal product. When small amounts of hydroxide are used, the recovery of the ketal is not complete and the product contains a low concentration of ketal. When the amounts are increased to over 20 times the ketal solution, the product will be practically pure ketal, but the recovery is low. The optimum ratio is to use the hydroxide in amounts about 2 to 5 times the volume of ketal solution.

The ratio of ketone to alcohol in the ketal mixture and the temperature do not materially affect the recovery. For convenience, the separation is usually carried out at room temperature. Lower temperatures would favor the recovery, but the improvement is not sufficient to offset the additional cost of cooling.

By this process, practically all of the ketal can be easily recovered in a product having over 95 percent ketal. If it is desirable to further purify the ketal, this may easily be done by vacuum distillation, or the product can be chemically dried and then distilled at atmospheric pressures. The lower ketals will hydrolyze in the presence of water at high temperatures so that it is necessary to effect the distillation at a low temperature, or to remove the water. In the product as recovered after the hydroxide extraction, the amount of alcohol and ketone present with the ketal will not create azeotropic problems upon distillation. The alcohol and acetone extracted by the hydroxide may be easily separated from the hydroxide solution by distillation and returned to the process.

The following examples will further illustrate the invention. In the examples, the "percent" as given is in weight percent.

*Example I*

80 grams of ketal mixture containing 73.8 percent methanol, 9.8 percent acetone, 14.0 percent 2,2-dimethoxypropane and 2.4 percent water were placed in a separatory funnel. 525 grams of 15 percent sodium hydroxide solution were added to the ketal mixture. The layers of the resulting heterogeneous solution were separated and analyzed.

The ketal layer weighed 10.5 grams and contained 89 percent ketal, 8.6 percent acetone and methanol, and 2.4 percent water. The sodium hydroxide layer weighed 594.5 grams and contained 0.3 percent ketal, 11.0 percent alcohol and acetone, and 88.7 percent caustic solution. This one stage contact gave an 83 percent recovery of the ketal in a product containing 89 percent ketal.

*Example II*

The same procedure as in Example I was followed.

The ketal mixture used contained 52.2 grams of methanol, 10.1 grams of acetone, 2.7 grams of water, and 15.2 grams of 2,2-dimethoxypropane. To this mixture, 315 grams of 15 percent sodium hydroxide solution were added.

The ketal layer obtained weighed 16.3 grams and contained 84 percent ketal, 2 percent alcohol, 9 percent acetone, and 5 percent water. The caustic layer weighed 348.9 grams and contained 13 percent sodium hydroxide, 71 percent water, 2 percent acetone, 14 percent alcohol and 0.4 percent ketal. This gave a 90.1 percent recovery of the ketal in a product containing 84 percent ketal.

*Example III*

The same procedure as in Example I was followed.

The ketal mixture used contained 75.2 grams of ethanol, 9.3 grams of acetone, 3.1 grams $H_2O$ and 22.4 grams of 2,2-diethoxypropane. To this mixture, 432 grams of 15 percent sodium hydroxide solution were added.

The ketal layer weighed 23.5 grams and was composed of 21.3 grams of diethoxypropane, 0.5 gram of ethanol, 1.0 gram of acetone and 0.7 gram of water. The sodium hydroxide layer weighed 518.5 grams and contained 1.1 grams of diethoxypropane, 74.7 grams of ethyl alcohol, 8.3 grams acetone, 369.4 grams $H_2O$ and 65 grams sodium hydroxide.

This gave a 95 percent recovery of the ketal in a product containing 90.5 percent ketal.

*Example IV*

A 35 foot column, 6 inches in diameter and packed to a depth of 30 feet with 2 inch steel rings, was operated at atmospheric temperature and pressure. A ketal mixture containing 67.0 percent methanol, 19.6 percent acetone, 2.1 percent water, and 11.3 percent 2,2-dimethoxypropane was fed to the bottom of the column at a rate of 271 pounds per hour and a 16.7 percent sodium hydroxide solution was introduced at the top at a rate of 1029 pounds per hour.

Ketal product was removed from the top of the tower at a rate of 31.4 pounds per hour which contained 97 percent 2,2-dimethoxypropane, 1.5 percent acetone, 1.5 percent water, and a trace of methanol. The caustic solution obtained at the bottom of the column contained 14.3 precent methanol, 4.2 percent acetone, 68.1 percent water, and 13.6 percent sodium hydroxide. This gave a 99.67 percent recovery of ketal as a 97 percent concentrated product.

We claim:

1. A process for separation of a lower ketal from a solution containing water, a primary alcohol having from 1 to 3 carbon atoms, a ketone having from 3 to 5 carbon atoms, and the ketal in an amount greater than 5 weight percent, which comprises contacting the solution with an aqueous solution containing from 10 to 30 weight percent of a strong hydroxide selected from the group consisting of sodium hydroxide and potassium hydroxide in an amount such that the volume ratio of the hydroxide solution to the ketal solution is in the range of ½ to 20 to form a heterogeneous solution of a ketal-containing phase and a hydroxide phase, and separating the ketal-containing phase from the hydroxide phase.

2. A process according to claim 1 wherein the strong hydroxide is sodium hydroxide.

3. A process according to claim 1 wherein the strong hydroxide is potassium hydroxide.

4. A process for separation of a lower ketal from a solution containing water, a primary alcohol having from 1 to 3 carbon atoms, a ketone having from 3 to 5 carbon atoms, and the ketal in an amount greater than 5 weight percent and up to 97 weight percent, which comprises contacting the solution with an aqueous solution containing from 13 to 16 weight percent of sodium hydroxide in an amount such that the volume ratio of the sodium hydroxide solution to the ketal solution is in the range of 2 to 5 to form a heterogeneous solution of a ketal-containing phase and a hydroxide phase, and separating the ketal-containing phase from the hydroxide phase.

5. A process according to claim 4 wherein the lower ketal is 2,2-dimethoxypropane, the primary alcohol is methanol, and the ketone is acetone.

6. A process for separation of a lower ketal from a solution containing water, a primary alcohol having from 1 to 3 carbon atoms, a ketone having from 3 to 5 carbon atoms, and the ketal in an amount greater than 5 weight percent and up to 97 weight percent which comprises contacting the solution with an aqueous solution containing from 13 to 16 weight percent of potassium hydroxide in an amount such that the volume ratio of the potassium hydroxide solution to the ketal solution is in the range of 2 to 5 to form a heterogeneous solution of a ketal-containing phase and a hydroxide phase, and separating the ketal-containing phase from the hydroxide phase.

7. A process according to claim 6 wherein the lower ketal is 2,2-dimethoxypropane, the primary alcohol is methanol, and the ketone is acetone.

8. A process for the separation of a lower ketal from a solution containing water, a primary alcohol having from 1 to 3 carbon atoms, a ketone having from 3 to 5 carbon atoms, and the ketal in an amount from 10 to 20 weight percent, which comprises contacting the solution with an aqueous solution containing from 10 to 30 weight percent of a strong hydroxide selected from the group consisting of sodium hydroxide and potassium hydroxide in an amount such that the volume ratio of the hydroxide solution to the ketal solution is in the range of ½ to 20 to form a heterogeneous solution of a ketal-containing phase and a hydroxide phase, and separating the ketal-containing phase from the hydroxide phase.

9. A process for the separation of a lower ketal from a solution containing water, a primary alcohol having from 1 to 3 carbon atoms, a ketone having from 3 to 5 carbon atoms, and the ketal in an amount from 10 to 20 weight percent, which comprises contacting the solution with an aqueous solution containing from 13 to 16 weight percent of sodium hydroxide in an amount such that the volume ratio of the sodium hydroxide solution to the ketal solution is in the range of 2 to 5 to form a heterogeneous solution of a ketal-containing phase and a hydroxide phase, and separating the ketal-containing phase from the hydroxide phase.

10. A process according to claim 9 wherein the lower ketal is 2,2-dimethoxypropane, the primary alcohol is methanol, and the ketone is acetone.

11. A process for the separation of a lower ketal from a solution containing water, a primary alcohol having from 1 to 3 carbon atoms, a ketone having from 3 to 5 carbon atoms, and the ketal in an amount from 10 to 20 weight percent, which comprises contacting the solution with an aqueous solution containing from 13 to 16 weight percent of potassium hydroxide in an amount such that the volume ratio of the potassium hydroxide solution to the ketal solution is in the range of 2 to 5 to form a heterogeneous solution of a ketal-containing phase and a hydroxide phase, and separating the ketal-containing phase from the hydroxide phase.

12. A process according to claim 11 wherein the lower ketal is 2,2-dimethoxypropane, the primary alcohol is methanol, and the ketone is acetone.

References Cited in the file of this patent

UNITED STATES PATENTS 2,490,337    Croxall et al. _____ Dec. 6, 1949